UNITED STATES PATENT OFFICE.

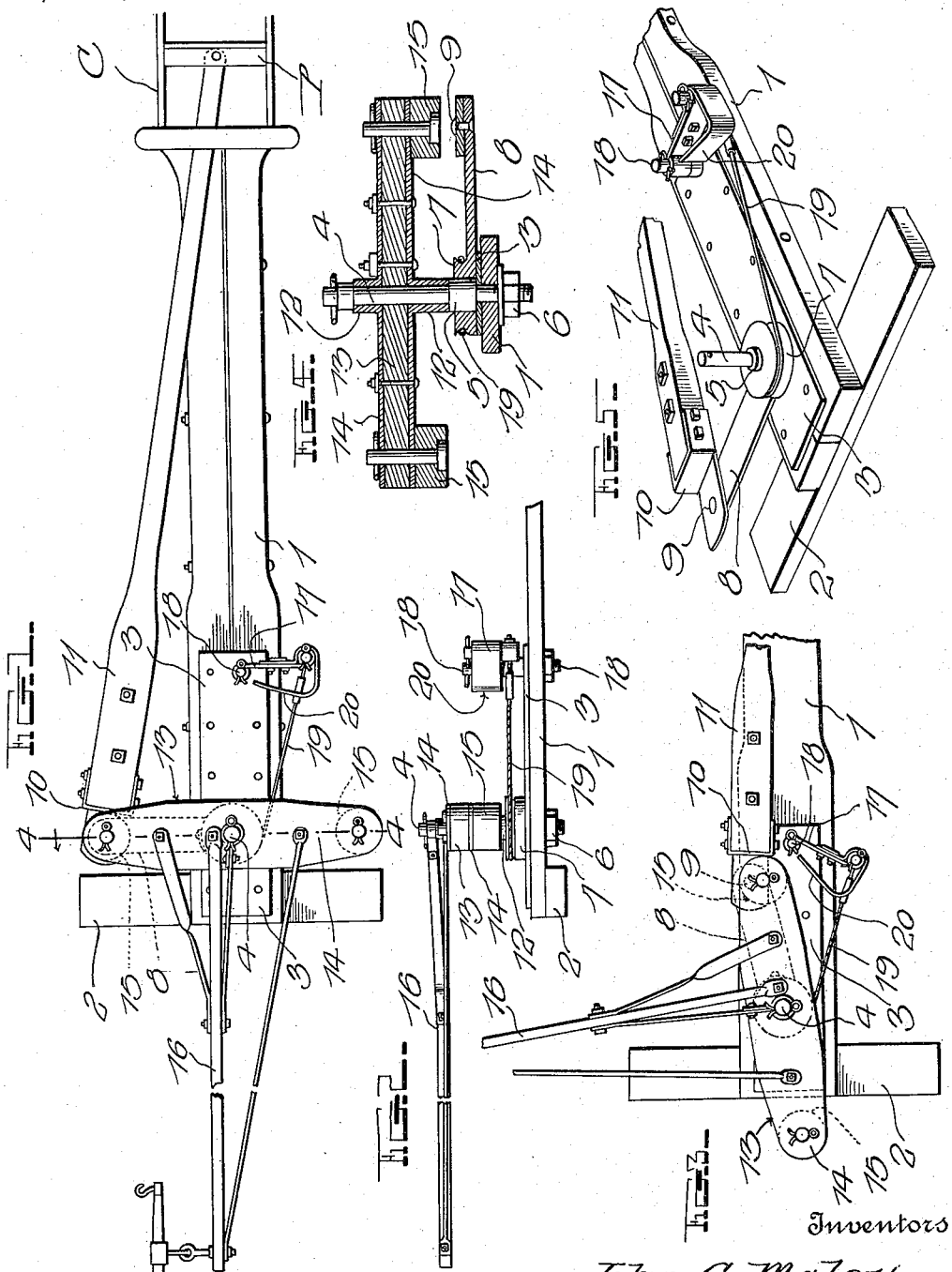

JOHN C. MALOY, OF MILAN, GEORGIA.

ACTUATING MEANS FOR BALING-PRESS PLUNGERS AND THE LIKE.

1,159,241.   Specification of Letters Patent.   Patented Nov. 2, 1915.

Application filed April 23, 1915. Serial No. 23,481.

*To all whom it may concern:*

Be it known that I, JOHN C. MALOY, a citizen of the United States, residing at Milan, in the county of Telfair and State of Georgia, have invented certain new and useful Improvements in Actuating Means for Baling-Press Plungers and the like; and I do declare the following to be a full, clear, and exact description of the invention, such as will enable others skilled in the art to which it appertains to make and use the same.

My invention relates broadly to improvements in baling presses and more particularly to those having horizontal sweeps moved around circular paths by horse power.

The object of the invention is to improve upon the general construction of presses of this class to such an extent as to provide a press which may be easily and inexpensively manufactured and marketed, and yet one which will possess efficiency and durability.

With this general object in view, the invention resides in certain novel features of construction, and in unique combinations of parts hereinafter fully described and claimed.

In describing the invention, I shall refer to the accompanying drawings wherein like reference characters designate corresponding parts throughout the several views and wherein:

Figure 1 is a top plan view of a portion of a baling press constructed in accordance with my invention; Fig. 2 is a partial side elevation thereof; Fig. 3 is an additional plan view of the operating mechanism of the press, showing the same disposed to a different position from that shown in Fig. 1; Fig. 4 is a vertical transverse section as seen on the plane indicated by the line 4—4 of Fig. 1; and Fig. 5 is a perspective view of parts of the operating mechanism.

In this drawing which constitutes a part of the application, C indicates a suitably constructed bailing chamber having therein a plunger P to be successively projected and retracted, the material placed in the baling chamber being compressed upon each forward stroke of the plunger as is common with devices of this class.

Leading forwardly from the open front end of the baling chamber C, is a base 1 which may be of any preferred construction, it being shown in the present application as provided at its front end with a transverse bar 2 which rests upon the ground or upon any other support upon which the press is being operated. Secured to the upper side of the base 1 at the front end thereof, is a bed plate 3 through which and through the base 1, an upright shaft 4 passes, this shaft being extended a considerable distance above the bed plate 3 and being provided with a shoulder 5 contacting with the upper side of said plate, the lower end of the shaft being provided with a nut 6 threaded thereon, whereby to effectively retain the shaft 4 in upright position when tightened.

Rotatably mounted on the shoulder 5 which is of cylindrical formation, is a pulley 7 from which an arm 8 projects horizontally, the outer end of this arm being pivoted at 9 to an extension on a wear plate 10 disposed at the front end of the longitudinally extending plunger bar 11, the rear end of this bar being secured in any preferred manner to the plunger P.

Having hubs 12 at its center rotatably mounted upon the portion of the shaft 4 disposed above the shoulder 5, is a horizontally disposed bar 13, the aforesaid hubs being secured in any preferred manner to said bar but being preferably cast integrally with upper and lower metal plates 14 which are bolted or otherwise secured to the upper and lower sides of said bar, the latter being preferably of wood for the sake of lightness. Disposed beneath the opposite ends of the bar 13, are rollers or the like 15 which, when said bar is turned around the shaft 4 by actuation of the sweep 16, travel around a circular path. It is on this path, that the wear plate 10 is disposed, whereby as the bar 13 is rotated or revolved, the rollers 15 will contact with said plate to project the plunger P twice during each circular trip of the sweep 16, said plunger being retracted immediately after projection, by retracting means actuating in conjunction with the pulley and the arm 8.

The retracting means just described, includes a horizontally swinging arm 17 disposed on the circular path of the rollers 15 and adapted to be intermittently oscillated thereby, one end of the arm 17 being fulcrumed to an upright shaft or the like 18 rising from the bed plate 3, while the outer end thereof is connected to one end of a flexible operating element 19 here shown in the form of a cable, the other end of this element being passed partially around and secured to the pulley 7 as clearly shown in Figs. 1, 2 and 5. When the plunger is projected, the various parts of the actuating mechanism therefor stand as shown in Fig. 3, in which position it will be seen that the arm 17 is disposed oblique to the circular path upon which the rollers 15 travel. When this arm is positioned in this manner, a shock absorbing leaf spring 20 is presented toward the roller 15 which has previously projected the plunger bar 11, whereupon as the sweep 16 continues to move in the proper direction, this roller will come into contact with said spring 20, thereby rocking the arm 17 from the position shown in Fig. 3 to that disclosed in Fig. 1. This movement on the part of the arm 17 rotates the pulley 7 a fraction of a revolution and swings the arm 8 forwardly, thus retracting the plunger P through the instrumentality of the plunger bar 11 and positioning the wear plate 10 of the latter for contact with the approaching roller 15 whereupon the operation just described is repeated.

The provision of the spring 20 is not only essential as a shock absorber, but retraction of the plunger P is faciliated thereby, since when one of the rollers is first brought into contact with said spring, the friction existing between the various parts of the device is greater than the strength of said spring, thus causing the latter to be first sprung toward the arm 17 and thus placed under tension. When, however, the roller approaches the anchored end of the spring in question, the arm 17 is started on its movement, the tension of said spring being now exerted to suddenly shift said arm from the position disclosed in Fig. 3 to that shown in Fig. 1. This operation quickly returns the plunger and disposes the wear plate 10 in position to be struck by the approaching roller 15 before said roller is in position to strike said wear plate, thus giving the operators of the press ample time to insert a new charge therein.

From the foregoing description, taken in connection with the accompanying drawing, it will be evident that although an extremely simple machine has been provided for carrying out the object of the invention, the same will be highly efficient in operation and will possess a number of advantageous features. In this drawing, certain specific details of construction have been shown for accomplishing probably the best results, and in the preceding, such details have been described, but it will be evident that I need not be limited thereto or to character of materials, proportions of parts, and such minor features, otherwise than to the extent to which the appended claim restricts me.

I claim:—

In combination, a plunger to be successively projected and retracted, an operating member spaced from the plunger and traveling around a circular path, an arm pivoted at the axis of said member, a plunger bar pivoted to said arm at one end and connected to the plunger at its other end, said bar having a portion disposed on said circular path and intermittently struck by the operating member, whereby to project the plunger, a movable plunger retracting member likewise disposed on said circular path and intermittently struck and shifted by the operating member, a pulley rotatably mounted on the axis of the operating member and secured to the aforesaid arm, and a flexible operating element secured to said retracting member at one end and to a part movable with the arm at its other end, the intermediate portion of said cable being passed around the pulley.

In testimony whereof I have hereunto set my hand in presence of two subscribing witnesses.

JOHN C. MALOY.

Witnesses:
  J. A. GRIESBAUER,
  C. A. GIOVANNETTI.